(12) United States Patent
Mo (10) Patent No.: US 10,752,390 B2
(45) Date of Patent: Aug. 25, 2020

(54) KNOT TYING DEVICE AND METHOD (71) Applicant: Foshan Vehician Intelligent Equipment Co. Ltd., Foshan (CN)

(72) Inventor: Shaonan Mo, Foshan (CN)

( * ) Notice: Subject to any disclaimer, the term of this patent is extended or adjusted under 35 U.S.C. 154(b) by 112 days.

(21) Appl. No.: 16/139,514

(22) Filed: Sep. 24, 2018

(65) Prior Publication Data

US 2019/0092501 A1  Mar. 28, 2019

(51) Int. Cl.
*B65B 13/26* (2006.01)
*A22C 11/00* (2006.01)
*B65B 51/08* (2006.01)

(52) U.S. Cl.
CPC ............ *B65B 13/26* (2013.01); *A22C 11/005* (2013.01); *B65B 51/08* (2013.01)

(58) Field of Classification Search
CPC ....... B65B 13/26; B65B 13/265; B65B 13/30; B65B 13/305; B65H 69/04; A01K 91/04; A01K 97/00; A01D 59/04; A22C 11/005; A22C 11/112
USPC .................................................... 289/1.2, 17
See application file for complete search history.

(56) References Cited

U.S. PATENT DOCUMENTS

| | | | | |
|---|---|---|---|---|
| 219,605 A | * | 9/1879 | Travis ................... | B65H 69/04 289/12 |
| 1,025,980 A | * | 5/1912 | Freudling .............. | B65H 69/04 66/144 |
| 3,108,832 A | * | 10/1963 | Harper ................... | B65B 13/26 289/12 |
| 3,202,445 A | * | 8/1965 | Freudling .............. | B65H 69/04 289/4 |
| 3,212,800 A | * | 10/1965 | Freudling .............. | B65B 13/26 289/1.5 |
| 3,630,555 A | | 12/1971 | Newlin | |
| 3,700,272 A | | 10/1972 | Bauer | |
| 4,913,474 A | * | 4/1990 | Boquet ................... | B65B 13/26 289/12 |
| 5,971,447 A | | 10/1999 | Steck, III | |
| 8,936,282 B1 | | 1/2015 | Berdahl | |
| 10,188,088 B2 | * | 1/2019 | Zdroik ................... | A01K 97/01 |
| 2015/0143736 A1 | * | 5/2015 | Zdroik ................... | A01K 97/01 43/17 |
| 2016/0332757 A1 | * | 11/2016 | Lechevalier ............ | B65B 27/10 |

\* cited by examiner

*Primary Examiner* — Shaun R Hurley
*Assistant Examiner* — Bao-Thieu L Nguyen
(74) *Attorney, Agent, or Firm* — Erson IP (Nelson IP)

(57) ABSTRACT

A knot tying device is provided. The knot typing device includes a support with a gripper element with one end of the gripper element rotatably connected to the support, and the other end capable of being pressed on and released from the support; a gripper mechanism to grip a free end of a strand of material and carry the strand of material to wrap around the support capable of rising and falling; and a stripping mechanism to separate the strand of material wrapped around the support from the support to form a knot.

14 Claims, 11 Drawing Sheets

KNOT TYING DEVICE AND METHOD

CROSS-REFERENCE TO RELATED APPLICATIONS

This application is claims priority to Chinese Patent Application No. 201710866829.3 with a filing date of Sep. 22, 2017. The content of the aforementioned application, including any intervening amendments thereto, is incorporated herein by reference.

TECHNICAL FIELD

The present disclosure relates to the technical field of automatic production, and particularly relates to a device and method for tying a knot in an end portion of a strand or bundle of material.

BACKGROUND OF THE PRESENT INVENTION

There are many instances where in a production of material it is necessary to tie a knot. This is usually done by hand if the number is small and is a very time consuming operation; while this is usually done by automatic knot tying device if the number is large. In one particular instance, the production of collagen casings for use in the food industries such as sausage making, it is necessary to tie a single knot in the end of the casing so that when the casing is filled the filling material will not burst out of the end.

Collagen casings are produced in very long lengths which are shirred into a compact "stick", i.e. shirred casing stick, and one end is normally sealed. It is possible to seal the end by a lot of methods, but a knot is the most satisfactory, particularly when dealing with sausages, where the filling pressure is very high or the filling material is high in fluidity.

However, the existing knot tying device has the defects of complicated structure, complex actions, low speed, high cost and inconvenient operation.

SUMMARY OF PRESENT INVENTION

Aiming at the defects of complicated structure, complex actions, low speed, high cost and inconvenient operation in the knot tying device of the prior art, the present disclosure provides a knot tying device and a knot tying method with simple structure, high speed, low cost and convenient operation.

Technical solutions proposed in the present disclosure for the above technical problems are as follows:

In one aspect, a knot tying device is provided, comprising: a support with a gripper element, wherein one end of the gripper element is rotatably connected to the support, and the other end is capable of being pressed on and released from the support; a gripper mechanism to grip a free end of a strand or bundle of material and carry the strand or bundle of material to wrap around the support, wherein the support is capable of rising and falling; after the gripper mechanism carries the strand or bundle of material to wrap around the support at a position below the gripper element by at least half of a circle, the support falls and the gripper mechanism continues to carry the strand or bundle of material to wrap around the support so as to carry the strand or bundle of material to pass through a space between the support and the gripper element; and then the gripper element is pressed on the support so as to make the free end of the strand or bundle of material fixedly gripped between the gripper element and the support; and a stripping mechanism to separate the strand or bundle of material wrapped around the support from the support to form a knot.

Preferably, the strand or bundle of material is a natural casing, a collagen casing, a fiber casing or a plastic casing.

Preferably, the support is a column.

Preferably, the gripper mechanism is adapted to flexibly grip the free end of the strand or bundle of material, so that the free end of the strand or bundle of material is automatically separated from the gripper mechanism when the strand or bundle of material is stripped from the support by the stripping mechanism.

Preferably, the gripper mechanism is a gripper block, a pair of jaws or a group of press rollers.

Preferably, the gripper element fixedly grips the free end of the strand or bundle of material passing therethrough unless one end of the gripper element is released from the support.

Preferably, the stripping mechanism is a circular ring coaxial with the support or at least one pressing strip or pressing sheet arranged on a side wall of the support in a sliding manner, and the stripping mechanism moves up relative to the support so as to separate the strand or bundle of material wrapped around the support from the support.

In another aspect, a knot tying method is further provided, comprising the following steps:

S1. gripping a free end of a strand or bundle of material by a gripper mechanism and carrying the strand or bundle of material to wrap around the support, wherein a gripper element is arranged on the support, one end of the gripper element is rotatably connected to the support, and the other end is capable of being pressed on and released from the support;

S2. dropping the support after the strand or bundle of material is wrapped around the support at a position below the gripper element by at least half of a circle; continuing to carry the strand or bundle of material to wrap around the support by the gripper mechanism so as to carry the strand or bundle of material to pass through a space between the support and the gripper element, and pressing the gripper element on the support so as to make the free end of the strand or bundle of material fixedly gripped between the gripper element and the support; and S3. separating the strand or bundle of material wrapped around the support from the support to form a knot.

Preferably, the strand or bundle of material is a natural casing, a collagen casing, a fiber casing or a plastic casing.

Preferably, the support is a column.

Preferably, the free end of the strand or bundle of material is flexibly gripped in the gripper mechanism, so that the free end of the strand or bundle of material is automatically separated from the gripper mechanism when the strand or bundle of material is stripped from the support by the stripping mechanism.

Preferably, the gripper mechanism is a gripper block, a pair of jaws or a group of press rollers.

Preferably, the free end of the strand or bundle of material, which passes through a space between the support and the gripper element, is fixedly gripped between the gripper element and the support unless one end of the gripper element is released from the support.

Preferably, the stripping mechanism is a circular ring coaxial with the support or at least one pressing strip or pressing sheet arranged on a side wall of the support in a sliding manner, and the stripping mechanism moves up relative to the support so as to separate the strand or bundle of material wrapped around the support from the support.

In yet another aspect, a casing with a knot tied in one end of the casing by using the knot tying device described above is further provided.

Embodiments of the present disclosure have the following beneficial effects: In the knot tying device of the present disclosure, only one support, one gripper mechanism and one stripping mechanism are enough to complete knot tying operation without installing additional manipulators, scissors and other structures. The knot tying device is simple in structure and low in cost. The knot tying device of the present disclosure is smooth in operation and uninterrupted, precisely controls knot tying length and avoids the waste of raw material due to shearing of knotted ends.

DESCRIPTION OF THE DRAWINGS

In order to more clearly describe the technical solutions in the embodiments of the present disclosure or in the prior art, the drawings associated to the description of the embodiments or the prior art will be illustrated concisely hereinafter. Apparently, the drawings described below are only some embodiments according to the present disclosure. Numerous drawings therein will be apparent to one of ordinary skill in the art based on the drawings described in the disclosure without creative efforts.

FIGS. 2a-2h correspond to FIGS. 1a-1h, and show the operations involved diagrammatically as seen in the direction of the arrow A1 shown in FIG. 1a;

FIGS. 3a-3h correspond to FIGS. 1a-1h, and show the operations involved diagrammatically as seen in the direction of the arrow A2 shown in FIG. 1a;

In the figures: 100—support; 102—gripper element; 200—gripper mechanism; 300—a strand or bundle of material; 302—free end of the strand or bundle of material; 304—knot; and 400—stripping mechanism.

DETAILED DESCRIPTION OF PREFERRED EMBODIMENTS

In order to make the objects, technical solution and advantages of the present disclosure more clear, the present disclosure will be further described in detail with reference to the accompanying drawings and embodiments below. It should be understood that embodiments described here are only for explaining the present disclosure and the disclosure, however, should not be constructed as limited to the embodiment as set forth herein.

Referring to the drawings, like numbers, if any, indicate like components throughout the views. As used in the description herein and throughout the claims that follow, the meaning of "a", "an" and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure.

As used herein, "plurality" means two or more.

As used herein, the terms "comprising," "including," "having." "with," "containing," "involving," and the like are to be understood to be open-ended, i.e., mean including but not limited to.

Embodiment 1

The present embodiment provides a knot tying device. Referring to FIGS. 1a, 2a, 3a and 1h, the knot tying device comprises: a support 100, a gripper mechanism 200 and a stripping mechanism 400. The support 100 is provided with a gripper element 102. One end (i.e., a fixed end) of the gripper element 102 is rotatably connected to the support 100, and the other end (i.e., a free end) is capable of being pressed on and released from the support 100. The gripper mechanism 200 is configured to grip a free end 302 of a strand or bundle of material 300 and carry the strand or bundle of material 300 to wrap around the support 100. The support 100 is capable of rising and falling. After the gripper mechanism 200 carries the strand or bundle of material 300 to wrap around the support at a position below the gripper element 102 by at least half of a circle, the support 100 falls; and then the gripper mechanism 200 continues to carry the strand or bundle of material 300 to wrap around the support 100 so as to carry the strand or bundle of material 300 to pass through a space between the support 100 and the gripper element 102. The gripper element 102 is pressed on the support 100 so as to make the free end 302 of the strand or bundle of material 300 fixedly gripped between the gripper element 102 and the support 100. The stripping mechanism 400 is used to separate the strand or bundle of material 300 wrapped around the support 100 from the support 100 to form a knot 304.

The knot tying operations executed by the knot tying device of the present disclosure will be described below in detail with reference to FIGS. 1a-1h, FIGS. 2a-2h and FIGS. 3a-3h.

Figure 1A:
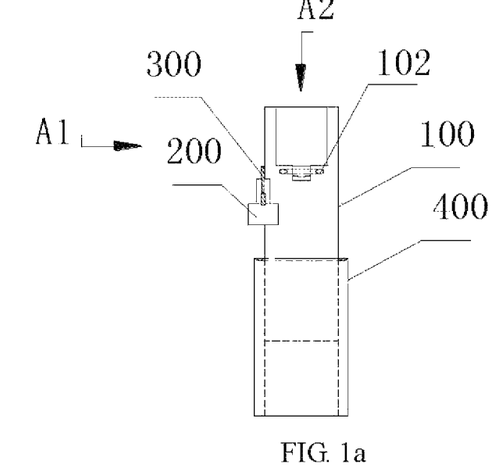
FIGS. 1a-1h illustrate diagrammatically a sequence of operations for tying a not according to the present disclosure.
Figure 2A:
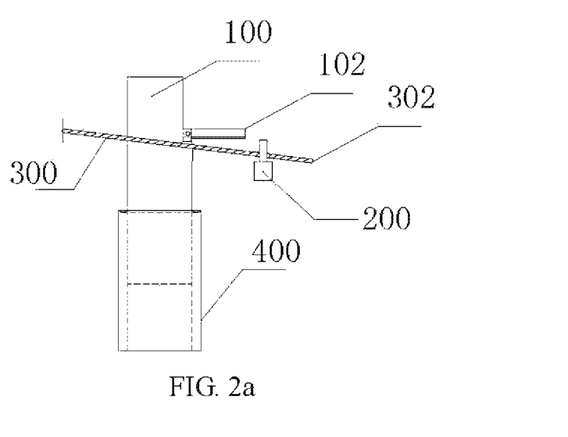
Figure 3A:
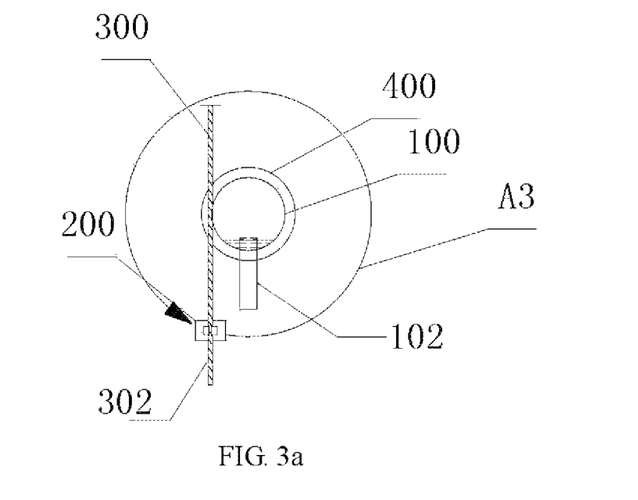
Figure 5A:
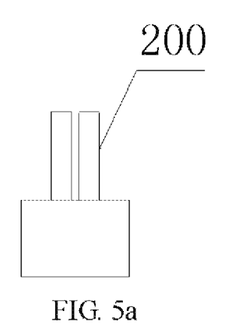
FIGS. 5a-5c are structural top views of a gripper mechanism according to the present disclosure.
Figure 5B:
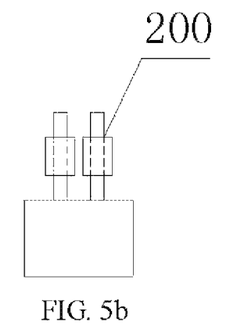
Figure 5C:
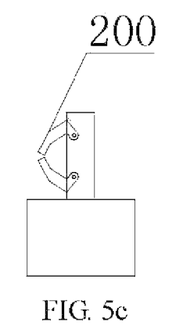
Figure 7:
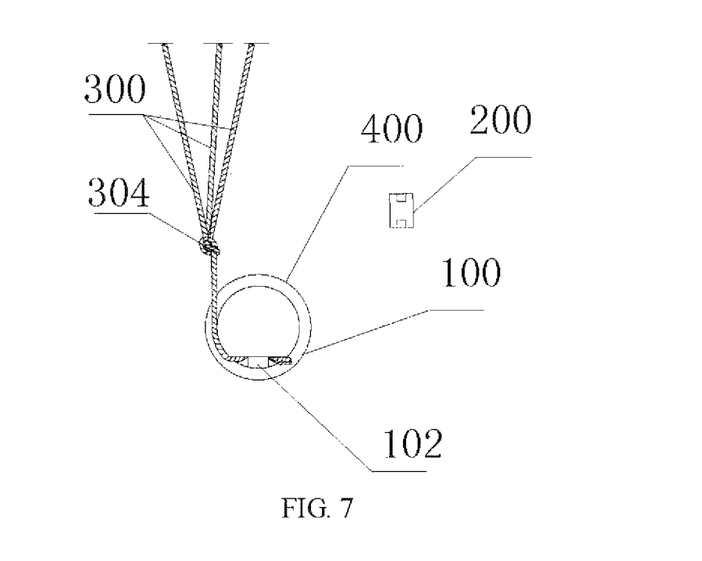
FIG. 7 is a structural schematic diagram of a knot tying device in a state that a knot is tied in one end of a bundle of material according to the present disclosure.

As shown in FIGS. 1a, 2a and 3a, in the first step of the knot tying operations, the gripper mechanism 200 grips the free end 302 of the strand or bundle of material 300. In the present disclosure, the strand or bundle of material 300 may be any material which is directly suitable for tying a knot or any material which is suitable for tying a knot through special treatment. The texture of the strand or bundle of material 300 is not limited in the present disclosure. As shown in FIG. 1a and FIG. 7, the knot tying device of the present disclosure can be used for tying a single strand of material and tying two or more strands (i.e., a bundle) of material. Before or when the gripper mechanism 200 grips the strand or bundle of material 300, the free end of the strand or bundle of material can be twisted together. In some embodiments of the present disclosure, the strand or bundle of material 300 may be a natural casing, a collagen casing, a fiber casing or a plastic casing. Before the gripper mechanism 200 grips the free end of the casing, the casing can also be twisted into a rope. In the present disclosure, the gripper mechanism 200 may be any device (e.g., a gripper block (as shown in FIG. 5a), a pair of jaws (as shown in FIG. 5c) or a group of press rollers (as shown in FIG. 5b)) suitable for gripping the free end of the strand or bundle of material.

Figure 1B:
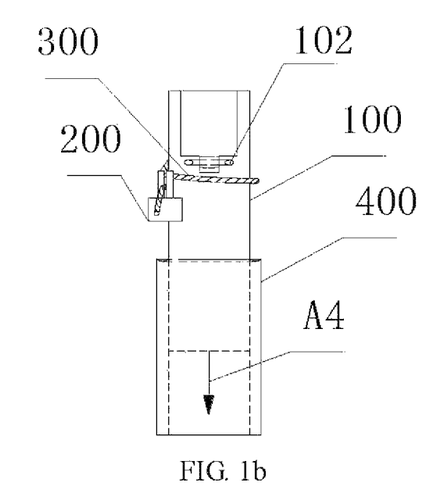
Figure 2B:
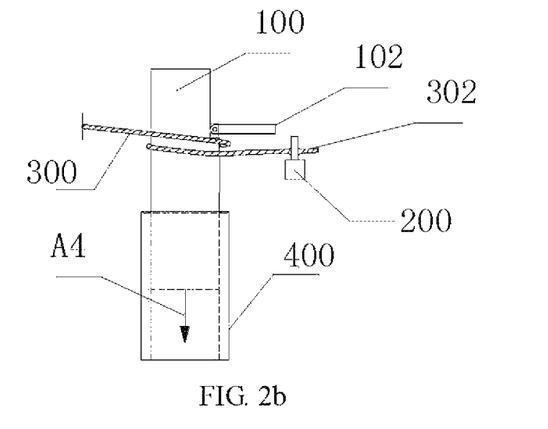
Figure 3B:
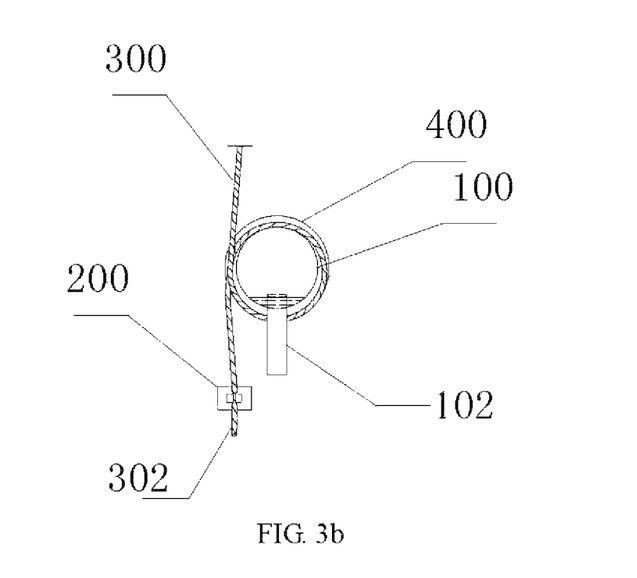
Figure 3C:
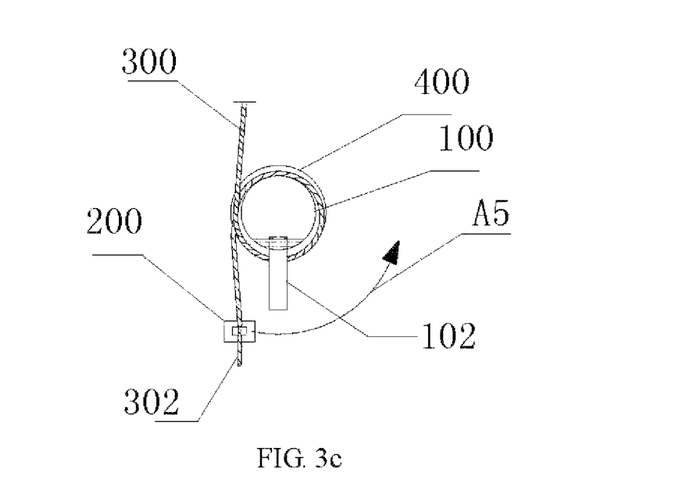
Figure 4A:
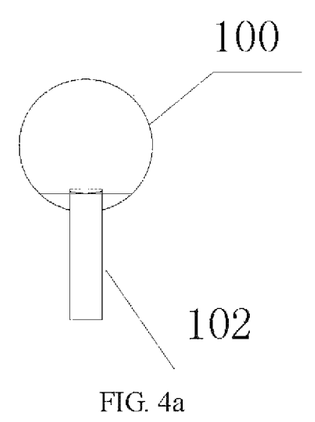
FIGS. 4a-4c are structural top views of a support according the present disclosure.
Figure 4B:
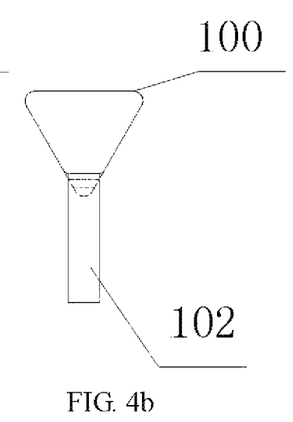
Figure 4C:
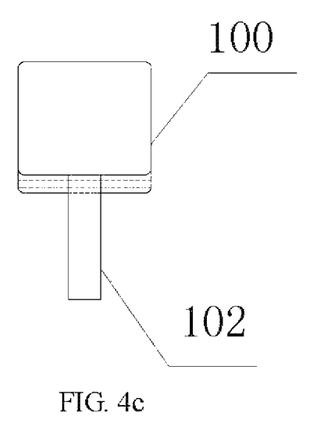

In the second step of the knot tying operations, the gripper mechanism 200 carries the strand or bundle of material 300 to wrap around the support 100 anticlockwise or clockwise by at least half of a circle, e.g., to wrap along the direction of an arrow A3 shown in FIG. 3a by one circle. It should be understood that, a wrapping angle of the gripper mechanism 200 depends on an initial position of the gripper mechanism 200, and those skilled in the art can adjust the wrapping degrees of the gripper mechanism 200 around the support 100 according to the instruction of the present disclosure without creative efforts. In the present disclosure, the support 100 may be in any shape, such as a column or other irregular shapes. As shown in FIGS. 4a-4c, the support 100 may be a cylinder, a triangular prism or a tetragonal prism structure. Of course, the support 100 can also be in other proper shapes, and is not limited herein. The support 100 can also be made of various materials, such as metal, plastic, wood, ceramic or other proper material. As shown in FIG. 2a, when the knot tying device is in an initial state, the free end of the gripper element 102 is released from the support 100 and the gripper mechanism 200 is located below the gripper element 102. Therefore, after the gripper mechanism 200 carries the strand or bundle of material 300 to wrap by at least half of a circle, the strand or bundle of material 300 is wrapped around the support at a position below the gripper element 102, as shown in FIGS. 1b, 2b and 3b.

Figure 1C:
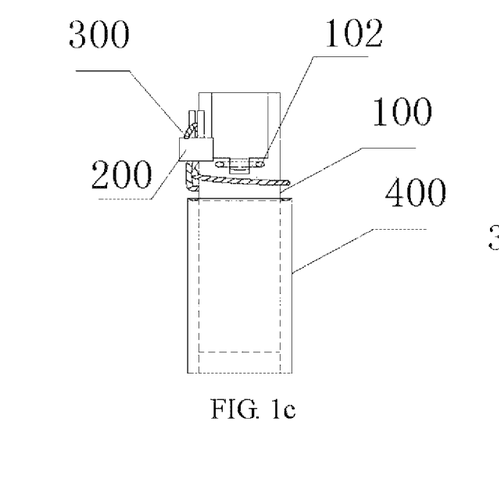
Figure 1D:
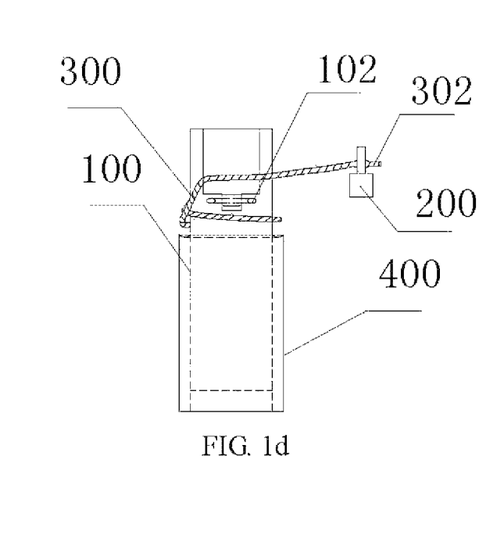
Figure 2C:
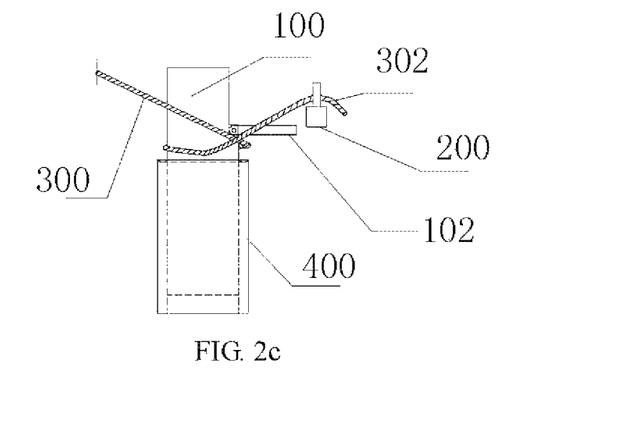

In an embodiment of the present disclosure, as shown in FIG. 3a, the initial position of the gripper mechanism 200 is close to one side of the gripper element 102. The gripper mechanism 200 carries the strand or bundle of material 300 from the initial position to pass through the support at a position below the gripper element 102, wrap around the support 100 by one circle and then return to the initial position, as shown in FIG. 3b. At this moment, the third step of the knot tying operations is entered. The support 100 moves down along the direction of an arrow A4 shown in FIGS. 1b and 2b, i.e., moves towards the stripping mechanism 400. Therefore, the gripper element 102 moves down together with the support 100 until the gripper element 102 is located below the gripper mechanism 200, as shown in FIG. 1c and FIG. 2c. At this moment, the gripper mechanism 200 continues to carry the free end 302 of the strand or bundle of material 300 to wrap along the direction of an arrow A5 shown in FIG. 3c. Therefore, the strand or bundle of material 300 passes through a space between the support 100 and the gripper element 102, as shown in FIGS. 1d, 2d and 3d.

Figure 1E:
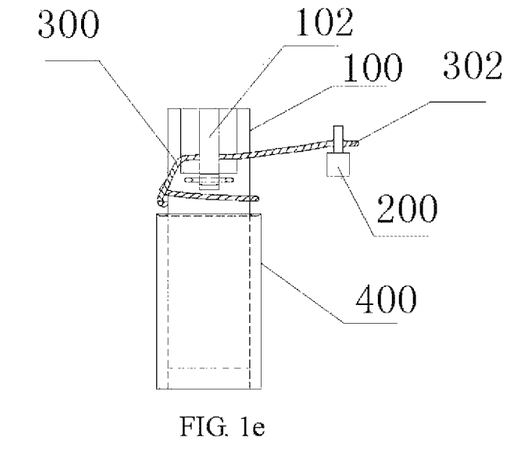
Figure 2D:
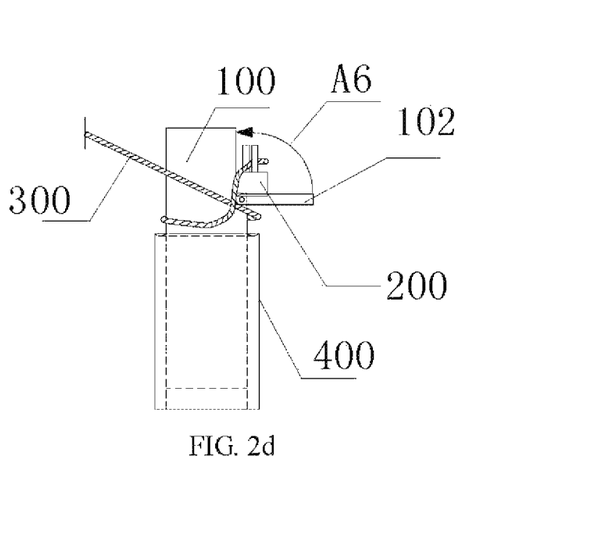
Figure 2E:
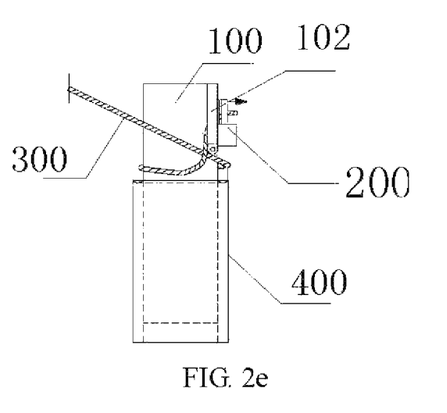
Figure 3D:
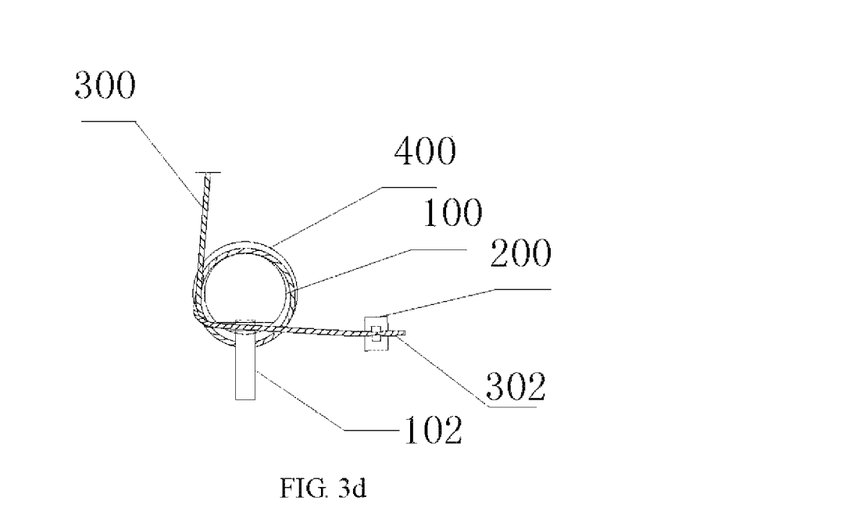
Figure 3E:
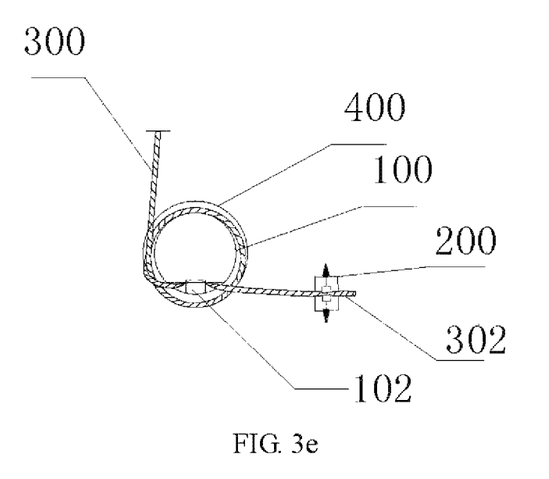
Figure 3F:
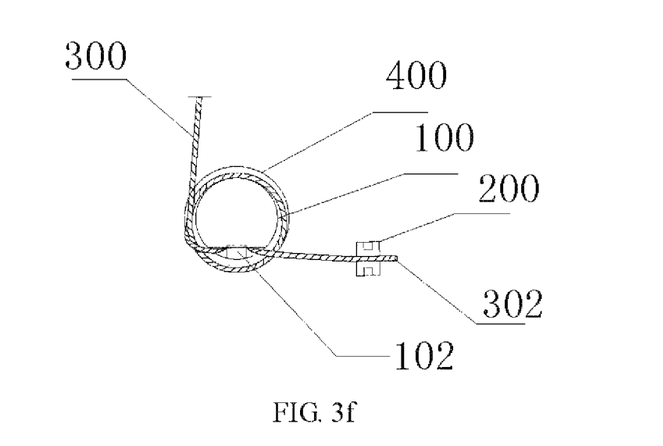
Figure 3G:
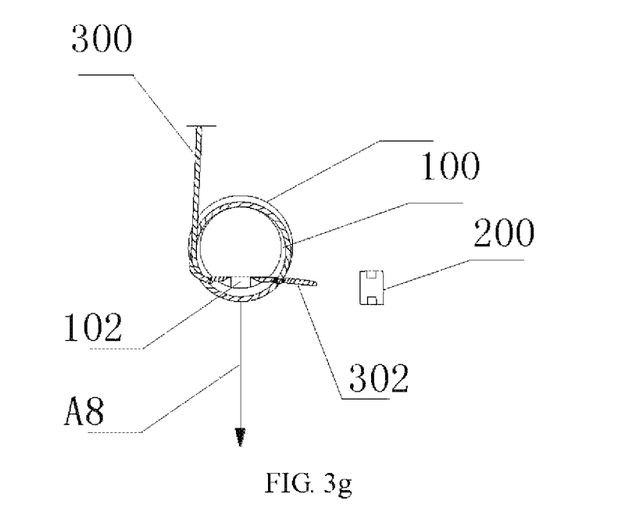

In the fourth step of the knot tying operations, after the free end of the strand or bundle of material 300 passes through a space between the gripper element 102 and the support, the free end of the gripper element 102 is pressed on the support 100 along the direction of an arrow A6 shown in FIG. 2d, so as to make the free end 302 of the strand or bundle of material 300 fixedly gripped between the support 100 and the gripper element 102, as shown in FIGS. 1e, 2e and 3e.

Figure 1F:
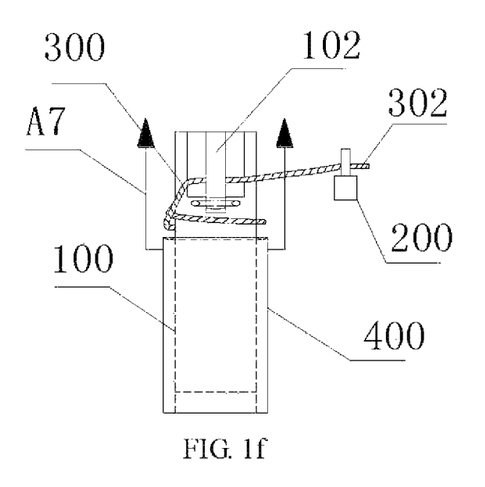
Figure 1G:
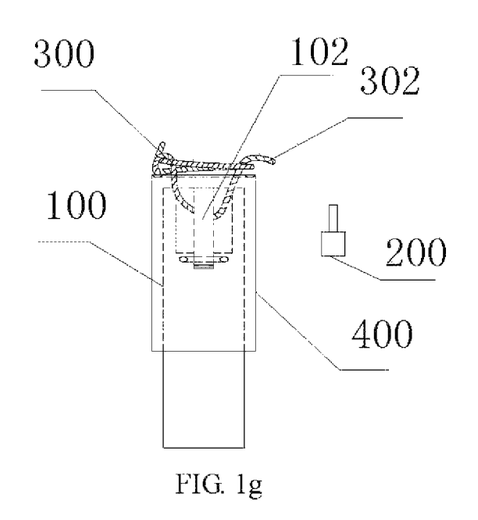
Figure 2F:
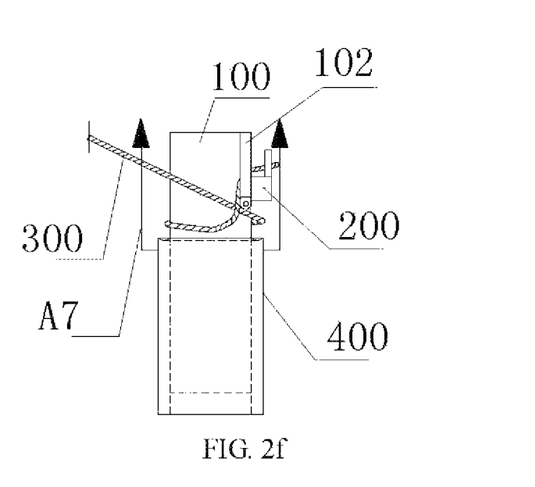
Figure 2G:
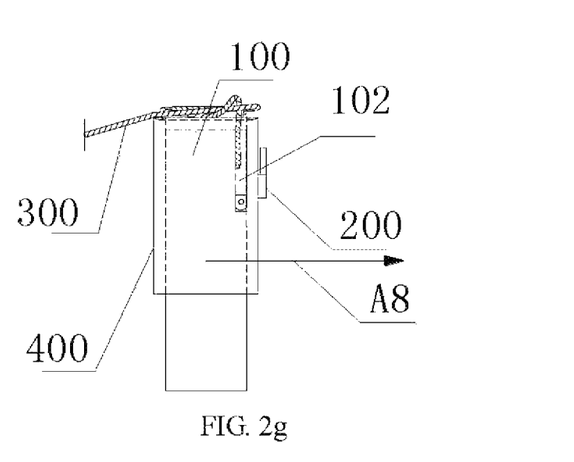
Figure 6A:
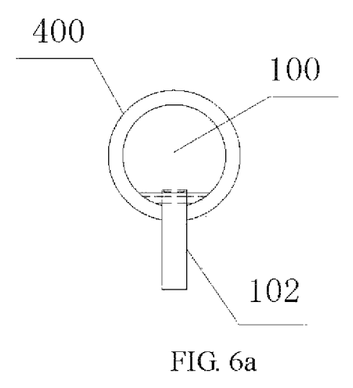
FIGS. 6a-6c are structural top views of a stripping mechanism according to the present disclosure.
Figure 6B:
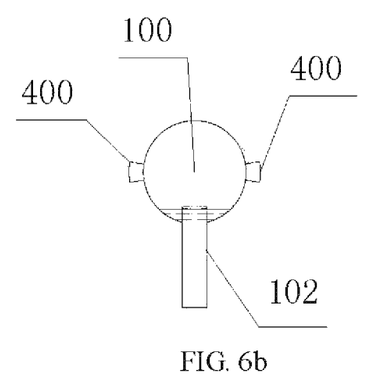
Figure 6C:
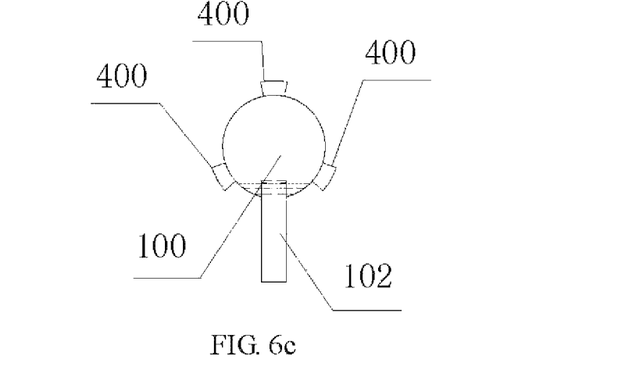

In the fifth step of the knot tying operations, the stripping mechanism 400 moves up along the direction of an arrow A7 shown in FIGS. 1f and 2f, i.e., moves towards the gripper element 102. When the knot tying device is in the initial state, the stripping mechanism 400 is located below the gripper element 102. In an embodiment of the present disclosure, as shown in FIG. 6a, the stripping mechanism 400 is a circular ring coaxial with the support 100. In another embodiment of the present disclosure, as shown in FIGS. 6b and 6c, the stripping mechanism 400 may also be at least one pressing strip or pressing sheet arranged on a side wall of the support 100. The stripping mechanism 400 and the support 100 can slide relative to each other. The stripping mechanism 400 and the support 100 are arranged with a distance therebetween such that the strand or bundle of material wrapped around the support 100 is ejected out of the support 100 by the stripping mechanism 400 when the stripping mechanism 400 moves up relative to the support 100, as shown in FIGS. 1g and 2g. In an embodiment of the present disclosure, the free end 302 of the strand or bundle of material 300 is fixedly gripped between the gripper element 102 and the support 100; and the free end 302 of the strand or bundle of material 300 will be not released from the gripper element 102 until the free end of the gripper element 102 is released from the support 100. Namely, the stripping mechanism 400 is not capable of releasing the free end 302 of the strand or bundle of material 300 from the gripper element 102, as shown in FIGS. 1g and 2g. However, in the present disclosure, the gripper mechanism 200 is adapted to flexibly grip the free end 302 of the strand or bundle of material 300, so that the free end 302 of the strand or bundle of material 300 is automatically separated from the gripper mechanism 200 when the strand or bundle of material 300 is stripped from the support 100 by the stripping mechanism 400, as shown in FIGS. 1g and 2g. In other embodiments of the present disclosure, the gripper mechanism 200 can also fixedly grip the free end of the strand or bundle of material 300, and the gripper mechanism 200 is opened actively by a drive device so as to release the free end 302 of the strand or bundle of material 300.

Figure 1H:
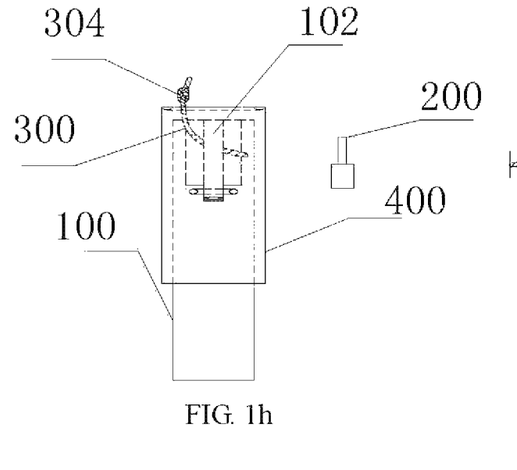
Figure 2H:
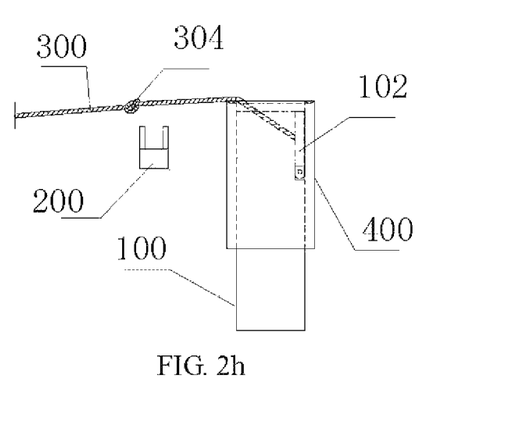
Figure 3H:
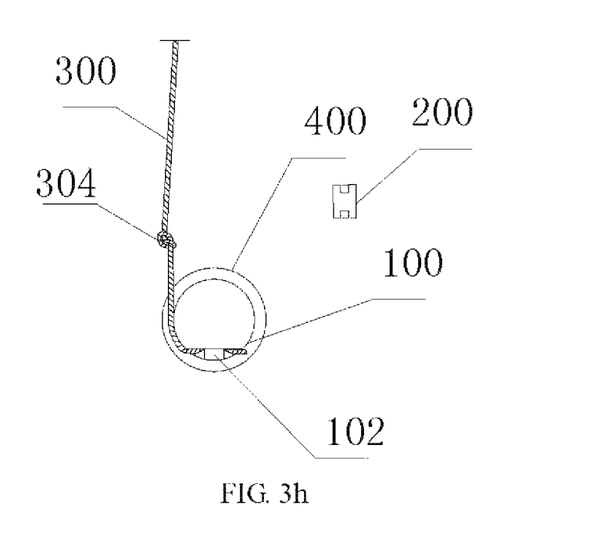

As an optional operation, in the sixth step of the knot tying operations, the support 100 can horizontally move away from the strand or bundle of material 300 along the direction of an arrow A8 shown in FIG. 2g. At this moment, the free end 302 of the strand or bundle of material 300 is still gripped between the gripper element 102 and the support 100. When the support 100 horizontally moves, a firm knot 304 is formed at the free end of the strand or bundle of material 300, as shown in FIGS. 1h, 2h and 3h.

After knot tying is completed, the knot tying device restores to the initial state and starts a next knot tying operation.

In the knot tying device of the present disclosure, only one support, one gripper mechanism and one stripping mechanism are enough to complete the knot tying operation without installing additional manipulators, scissors and other structures, and has simple structure and low cost. The knot tying device of the present disclosure is smooth in operation and uninterrupted. Moreover, under the condition that the size of the support 100 is determined, the length of the strand or bundle of material 300 required for wrapping can be accurately computed according to the position of the gripper mechanism 200. Because the gripper mechanism 200 flexibly grips the free end of the strand or bundle of material 300, in the process that the strand or bundle of material 300 is wrapped around the support 100, the free end of the strand or bundle of material 300 is continuously drawn out of the gripper mechanism 200, and the gripper element 102 can essentially grip a portion closest to the end of the strand or bundle of material 300 at the time of knot tying finally. Therefore, the present disclosure can accurately control the knot tying length and avoid the waste of raw material due to shearing of knotted ends.

Embodiment 2

Figure 8:
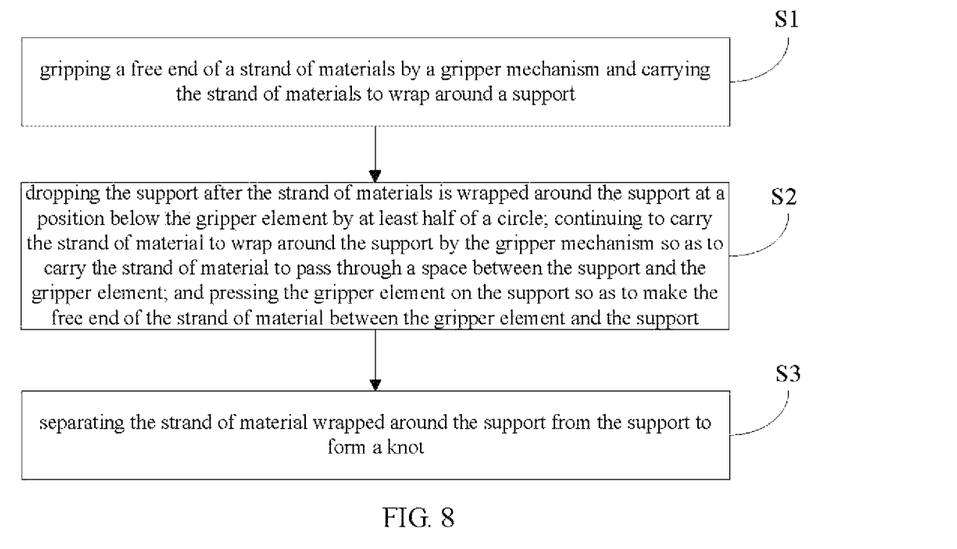
FIG. 8 is a flow chart of a knot tying method according to the present disclosure.

The present embodiment provides a knot tying method which, as shown in FIG. 8, comprises the following steps S1-S3:

S1. gripping a free end of a strand or bundle of material by a gripper mechanism and carrying the strand or bundle of material to wrap around the support, wherein as shown in FIGS. 1a-1h, 2a-2h and 3a-3h, a gripper element 102 is arranged on the support 100; one end of the gripper element 102 is fixedly connected to the support 100, and the other end is capable of being pressed on and released from the support 100.

In the present disclosure, the strand or bundle of material 300 may be any material which is directly suitable for knot tying or any material which is suitable for knot tying with special treatment. The texture of the strand or bundle of material 300 is not limited by the present disclosure. As shown in FIG. 1a and FIG. 7, the knot tying device of the present disclosure can be used for tying a single strand of material and tying two or more strands (i.e., a bundle) of material. Before or when the gripper mechanism 200 grips the strand or bundle of material 300, the free end of the strand or bundle of material can be twisted together. In some embodiments of the present disclosure, the strand or bundle of material 300 may be a natural casing, a collagen casing, a fiber casing or a plastic casing. Before the gripper mechanism 200 grips the free end of the casing, the casing can also be twisted into a rope. In the present disclosure, the gripper mechanism 200 may be any device (e.g., a gripper block (as shown in FIG. 5a), a pair of jaws (as shown in FIG. 5c) or a group of press rollers (as shown in FIG. 5b)) suitable for clamping the free end of the strand or bundle of material.

The gripper mechanism 200 carries the strand or bundle of material 300 to wrap around the support 100 anticlockwise or clockwise by at least half of a circle, e.g., wrap along the direction of an arrow A3 in FIG. 3a by a circle. It should be understood that, a wrapping angle of the gripper mechanism 200 depends on an initial position of the gripper mechanism 200, and those skilled in the art can adjust wrapping degrees of the gripper mechanism 200 around the support 100 according to the instruction of the present disclosure without creative efforts. In the present disclosure, the support 100 may be in any shape, such as a column or other irregular shapes. As shown in FIGS. 4a-4c, the support 100 may be a cylinder, a triangular prism or a tetragonal prism structure. Of course, the support 100 can also be in other proper shapes, and is not limited herein. The support 100 can also be made of various materials, such as metal, plastic, wood, ceramic or other proper material. As shown in FIG. 2a, when the knot tying device is in an initial state, the free end of the gripper element 102 is released from the support 100 and the gripper mechanism 200 is located below the gripper element 102. Therefore, after the gripper mechanism 200 carries the strand or bundle of material 300 to wrap by at least half of a circle, the strand or bundle of material 300 is wrapped around the support at a position below the gripper element 102, as shown in FIGS. 1b, 2b and 3b.

S2. dropping the support after the strand or bundle of material is wrapped around the support at a position below the gripper element by at least half of a circle so that the strand or bundle of material passes through the gripper element, and pressing the gripper element on the support so as to make the free end of the strand or bundle of material fixedly gripped between the gripper element and the support.

Specifically, in an embodiment of the present disclosure, as shown in FIG. 3a, the initial position of the gripper mechanism 200 is close to one side of the gripper element 102. The gripper mechanism 200 carries the strand or bundle of material 300 from the initial position to pass through the support at a position below the gripper element 102, wrap around the support 100 by one circle and then return to the initial position, as shown in FIG. 3b. At this moment, the third step of the knot tying operations is entered. The support 100 moves down along the direction of an arrow A4 shown in FIGS. 1b and 2b, i.e., moves towards the stripping mechanism 400. Therefore, the gripper element 102 moves down together with the support 100 until the gripper element 102 is located below the gripper mechanism 200, as shown in FIG. 1c and FIG. 2c. At this moment, the gripper mechanism 200 continues to carry the free end 302 of the strand or bundle of material 300 to wrap along the direction of an arrow A5 shown in FIG. 3c. Therefore, the strand or bundle of material 300 passes through the gripper element 102, as shown in FIGS. 1d, 2d and 3d.

After the free end of the strand or bundle of material 300 passes through the gripper element 102, the free end of the gripper element 102 is pressed on the support 100 along the direction of an arrow A6 shown in FIG. 2d, so as to make the free end 302 of the strand or bundle of material 300 fixedly gripped between the support 100 and the gripper element 102, as shown in FIGS. 1e, 2e and 3e.

S3. separating the strand or bundle of material wrapped around the support from the support to form a knot.

Specifically, the stripping mechanism 400 moves up along the direction of an arrow A7 shown in FIGS. 1f and 2f, i.e., moves towards the gripper element 102. When the knot tying device is in the initial state, the stripping mechanism 400 is located below the gripper element 102. In an embodiment of the present disclosure, as shown in FIG. 6a, the stripping mechanism 400 is a circular ring coaxial with the support 100. In another embodiment of the present disclosure, as shown in FIGS. 6b and 6c, the stripping mechanism 400 may also be at least one pressing strip or pressing sheet arranged on a side wall of the support 100. The stripping mechanism 400 and the support 100 can slide relative to each other. The stripping mechanism 400 and the support 100 are arranged with a distance therebetween such that the strand or bundle of material wrapped around the support 100 is ejected out of the support 100 by the stripping mechanism 400 when the stripping mechanism 400 moves up relative to the support 100, as shown in FIGS. 1g and 2g. In an embodiment of the present disclosure, the free end 302 of the strand or bundle of material 300 is fixedly gripped between the gripper element 102 and the support 100; and the free end 302 of the strand or bundle of material 300 will not separate from the gripper element 102 until the free end of the gripper element 102 is released from the support 100. Namely, the stripping mechanism 400 is not capable of releasing the free end 302 of the strand or bundle of material 300 from the gripper element 102, as shown in FIGS. 1g and 2g. However, in the present disclosure, the gripper mechanism 200 is adapted to flexibly grip the free end 302 of the strand or bundle of material 300, so that the free end 302 of the strand or bundle of material 300 is automatically separated from the gripper mechanism 200 when the strand or bundle of material 300 is stripped from the support 100 by the stripping mechanism 400, as shown in FIGS. 1g and 2g. In other embodiments of the present disclosure, the gripper mechanism 200 can also fixedly grip the free end of the strand or bundle of material 300, and the gripper mechanism 200 is opened actively by a drive device so as to release the free end 302 of the strand or bundle of material 300.

As an optional operation, the support 100 can horizontally move away from the strand or bundle of material 300 along the direction of an arrow A8 shown in FIG. 2g. At this moment, the free end 302 of the strand or bundle of material 300 is still gripped between the gripper element 102 and the support 100. When the support 100 horizontally moves, a firm knot 304 is formed in the free end of the strand or bundle of material 300, as shown in FIGS. 1h, 2h and 3h.

After knot tying is completed, the knot tying device restores to the initial state and starts a next knot tying operation.

Embodiment 3

The present embodiment provides a casing with a knot tied in one end of the casing by using the knot tying device of embodiment 1 or the knot tying method of embodiment 2. As shown in FIGS. 1a-1h, 2a-2h and 3a-3h, the casing 300 may be a natural casing, a collagen casing, a fiber casing or a plastic casing. Before the casing 300 is knotted, the casing 300 can also be twisted into a rope.

The above only discloses preferred embodiments of the present disclosure and certainly, shall not be used to define the scope of rights of the present disclosure. It can be understood for those ordinary skilled in the art that, all or some of flows to realize the above embodiments and equal changes made in accordance with claims of the present disclosure shall still belong to the scope covered by the present disclosure.

I claim:

1. A knot tying device, comprising: a support with a gripper element, wherein one end of the gripper element is rotatably connected to the support, and the other end is capable of being pressed on and released from the support; a gripper mechanism to grip a free end of a strand or bundle of material and carry the strand or bundle of material to wrap around the support, wherein the support is capable of rising and falling; after the gripper mechanism carries the strand or bundle of material to wrap around the support at a position below the gripper element by at least half of a circle, the support falls; the gripper mechanism continues to carry the strand or bundle of material to wrap around the support so as to carry the strand or bundle of material to pass through a space between the support and the gripper element; and then the gripper element is pressed on the support so as to make the free end of the strand or bundle of material fixedly gripped between the gripper element and the support; and a stripping mechanism to separate the strand or bundle of material wrapped around the support from the support to form a knot.

2. The knot tying device according to claim 1, wherein the strand or bundle of material is a natural casing, a collagen casing, a fiber casing or a plastic casing.

3. The knot tying device according to claim 1, wherein the support is a column.

4. The knot tying device according to claim 1, wherein the gripper mechanism is adapted to flexibly grip the free end of the strand or bundle of material, so that the free end of the strand or bundle of material is automatically separated from the gripper mechanism when the strand or bundle of material is stripped from the support by the stripping mechanism.

5. The knot tying device according to claim 1, wherein the gripper mechanism is a gripper block, a pair of jaws or a group of press rollers.

6. The knot tying device according to claim 1, wherein the gripper element fixedly grips the free end of the strand or bundle of material passing therethrough unless one end of the gripper element is released from the support.

7. The knot tying device according to claim 1, wherein the stripping mechanism is a circular ring coaxial with the support or at least one pressing strip or pressing sheet arranged on a side wall of the support in a sliding manner, and the stripping mechanism moves up relative to the support so as to separate the strand or bundle of material wrapped around the support from the support.

8. A knot tying method, comprising the following steps:
gripping a free end of a strand or bundle of material by a gripper mechanism and carrying the strand or bundle of material to wrap around a support, wherein a gripper element is arranged on the support, one end of the gripper element is rotatably connected to the support, and the other end is capable of being pressed on and released from the support;
dropping the support after the strand or bundle of material is wrapped around the support at a position below the gripper element by at least half of a circle; continuing to carry the strand or bundle of material to wrap around the support by the gripper mechanism so as to carry the strand or bundle of material to pass through a space between the support and the gripper element, and pressing the gripper element on the support so as to make the free end of the strand or bundle of material fixedly gripped between the gripper element and the support; and
separating the strand or bundle of material wrapped around the support from the support to form a knot.

9. The knot tying method according to claim 8, wherein the strand or bundle of material is a natural casing, a collagen casing, a fiber casing or a plastic casing.

10. The knot tying method according to claim 8, wherein the support is a column.

11. The knot tying method according to claim 8, wherein the free end of the strand or bundle of material is flexibly gripped in the gripper mechanism, so that the free end of the strand or bundle of material is automatically separated from the gripper mechanism when the strand or bundle of material is stripped from the support by the stripping mechanism.

12. The knot tying method according to claim 8, wherein the gripper mechanism is a gripper block, a pair of jaws or a group of press rollers.

13. The knot tying method according to claim 8, wherein the free end of the strand or bundle of material, which passes through a space between the support and the gripper element, is fixedly gripped between the gripper element and the support unless one end of the gripper element is released from the support.

14. The knot tying method according to claim 8, wherein the stripping mechanism is a circular ring coaxial with the support or at least one pressing strip or pressing sheet arranged on a side wall of the support in a sliding manner, and the stripping mechanism moves up relative to the support so as to separate the strand or bundle of material wrapped around the support from the support.

* * * * *